(12) United States Patent
Nardacci et al.

(10) Patent No.: US 7,618,333 B2
(45) Date of Patent: *Nov. 17, 2009

(54) GOLF BALL

(75) Inventors: Nicholas M. Nardacci, Bristol, RI (US);
Steven Aoyama, Marion, MA (US);
Robert A. Wilson, Sagamore, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/236,632

(22) Filed: Sep. 24, 2008

(65) Prior Publication Data

US 2009/0088273 A1 Apr. 2, 2009

Related U.S. Application Data

(63) Continuation of application No. 11/856,124, filed on Sep. 17, 2007, now Pat. No. 7,431,670, which is a continuation-in-part of application No. 11/273,175, filed on Nov. 14, 2005, now abandoned, which is a continuation-in-part of application No. 10/797,796, filed on Mar. 10, 2004, now Pat. No. 7,422,529.

(51) Int. Cl.
*A63B 37/12* (2006.01)
(52) U.S. Cl. ..................................................... 473/383
(58) Field of Classification Search .......... 473/383–385
See application file for complete search history.

(56) References Cited

U.S. PATENT DOCUMENTS

| 4,653,758 | A | 3/1987 | Solheim |
| 5,201,523 | A | 4/1993 | Miller |
| 5,249,804 | A | 10/1993 | Sanchez |
| 5,494,631 | A | 2/1996 | Oka et al. |
| 5,688,193 | A | 11/1997 | Kasashima et al. |
| 5,840,351 | A | 11/1998 | Inoue et al. |
| 5,947,844 | A | 9/1999 | Shimosaka et al. |
| 5,957,786 | A | 9/1999 | Aoyama |
| 6,106,415 | A | 8/2000 | Masutani et al. |
| 6,123,534 | A | 9/2000 | Kasashima et al. |

(Continued)

*Primary Examiner*—Raeann Trimiew
(74) *Attorney, Agent, or Firm*—D. Michael Burns

(57) ABSTRACT

A golf ball that is formed by a mold developed from a computerized modeling system such as CAD or CAE in combination with a CNC machine tool which superimposes a short waveform, or multiple waveforms, onto a longer base waveform to create a non-planar parting line that is functionally dependent on the underlying dimple geometry. The non-planar parting line is comprised of a plurality of peaks and valleys that are offset from the dimple perimeters, as not to bisect any dimple edge. Also, dimples on one side of the parting line interdigitate with dimples on the other side to form a more uniform distribution of dimples over the entire golf ball surface. Still further, the non-planar parting line has a amplitude which is less than 0.02 inch from an axis substantially coincident with the equator of the ball and the length of the parting line is less than 110 percent of the length of a curve defined by the circumference of the equator. Located at a plurality of sites on the non-planar parting line and offset from the equator are tabs which are formed on the ball to aid in the finishing operation wherein flash is removed from the ball parting line. The tabs are created by true sprues (vents) and false sprues on the parting surfaces of the ball mold halves.

8 Claims, 6 Drawing Sheets

U.S. PATENT DOCUMENTS

| | | |
|---|---|---|
| 6,200,232 B1 | 3/2001 | Kasashima et al. |
| 6,358,161 B1 | 3/2002 | Aoyama |
| 6,527,653 B2 | 3/2003 | Winfield et al. |
| 6,540,625 B2 | 4/2003 | Sajima |
| 6,632,078 B2 | 10/2003 | Ogg et al. |
| 6,644,948 B2 | 11/2003 | Mydlack et al. |
| 6,685,456 B2 | 2/2004 | Sajima |
| 6,749,525 B2 | 6/2004 | Aoyama |
| 6,849,007 B2 | 2/2005 | Morgan et al. |
| 6,893,362 B2 | 5/2005 | Sullivan |
| 6,936,208 B2 | 8/2005 | Ogg |
| 7,431,670 B2 * | 10/2008 | Nardacci et al. ............ 473/383 |

* cited by examiner

GOLF BALL

CROSS-REFERENCE TO RELATED APPLICATIONS

The present invention is a continuation of U.S. application Ser. No. 11/856,124, filed on Sep. 17, 2007 now U.S. Pat. No. 7,431,670, which was a continuation-in-part of a U.S. application Ser. No. 11/273,175, filed on Nov. 14, 2005 now abandoned, which was a continuation of U.S. application Ser. No. 10/797,796, filed on Mar. 10, 2004 now U.S. Pat. No. 7,422,529. The disclosures of which are incorporated herein in their entirety.

FIELD OF THE INVENTION

The invention relates in general to a mold for forming a golf ball, and more particularly, to an improved golf ball having a non-planar parting line based on a superposition of waveforms which are functionally dependent on the dimple pattern of the ball.

BACKGROUND OF THE INVENTION

The usual golf ball manufacturing techniques include several different steps, depending on the type of ball, such as one, two, three or even more than three piece balls. According to the traditional method, a solid or composite elastomeric core is made, and an outer dimpled cover is formed around the core.

The two standard methods for molding a cover over a core or a core and inner layers are compression molding and injection molding. The compression molding operation is accomplished by using a pair of hemispherical mold cavities, each of which has an array of protrusions machined or otherwise provided in its cavity, and those protrusions form the dimple pattern on the periphery of the golf ball during the cover molding operation. A pair of hemispherical cover blanks are placed in a diametrically opposed position on the golf ball body, and the body with the cover blanks thereon is placed in the hemispherical molds, and then subjected to a compression molding operation. The combination of heat and pressure applied during the molding operation results in the cover blanks being fused to the golf ball body and to each other to form a unitary one-piece cover structure which encapsulates the golf ball body. In addition, the cover blanks are simultaneously molded into conformity with the interior configuration of the hemispherical molds which results in the formation of the dimple pattern on the periphery of the golf ball cover. When dimple projections are machined in the mold cavity they are typically positioned below the theoretical parting line of the resulting mold cavity. The parting line is typically machined after the dimple forming process. For ease of manufacturing, the parting line on the cavity is usually machined flat normal to the bottom of the inner spherical mold surface. This provides positive shut off preventing flowing cover material from leaking out of the mold. This dimple positioning and flat parting line results in a great circle path on the ball that is essentially void of dimples. This is commonly referred to as the equator, parting line, or seam of the ball. Over the years dimple patterns have been developed to compensate for cosmetics and/or flight performance issues due to the presence of the seam.

As in all molding operations, when the golf ball is removed from the hemispherical molds subsequent to the molding operation, it will have molding flash, and possibly other projecting surface imperfections thereon. The molding flash will be located at the parting line of the hemispherical molds. The molding flash will therefore be on the "equator" of the golf ball.

The molding flash and possible other imperfections projecting from the surface need to be removed and this is normally accomplished by one or a combination of the following: cutting blades, sanding belts, or grinding stones, and the like. These types of processes tend to enhance the obviousness of the seam. Alternative finishing processes have been developed to minimize this effect. These processes include tumbling with abrasive media, stiff brushes, cryogenic deflashing and the like. Regardless of the finishing process, the result is a flat parting line substantially void of dimple coverage.

When flash is removed by a post-molding operation such as grinding, it is desirable that the molding operation be accomplished in such a manner that the molding flash is located solely on the "land" (undimpled) surface of the golf ball and does not extend into any of the dimples. In other words, the mold flash or other protrusions do not intersect or lie within a dimple boundary. Therefore, prior art hemispherical molds are primarily fabricated so that the dimple-forming protrusions formed therein are set back from the circular rims, or mouths of the cavities.

It is well known that the dimple pattern of a golf ball is a critical factor insofar as the flight characteristics of the ball are concerned. The dimples influence the lift and drag forces exerted on the golf ball which ultimately dictate its overall performance and flight stability. When a golf ball is struck properly, it will spin about an axis and the interaction between the dimples and the oncoming air stream will produce the desired lift, drag, and flight characteristics.

In order for a golf ball to achieve optimum flight consistency, it is beneficial for its dimples to be arranged with multiple axes of symmetry. Otherwise, it might fly differently depending upon orientation. Most prior art golf balls include a single dimple free equatorial parting line, which inherently limits the number of symmetry axes to one. In order to achieve good flight consistency, it is often necessary to compensate for this limitation by adjusting the positions and/or dimensions and/or shapes of certain dimples. Alternatively, additional symmetry axes can be created by incorporating additional dimple free "false" parting lines. However, this practice increases the amount of un-dimpled surface on the ball, which can result in reduced ball flight distance.

For maximum performance and consistency, it is preferable to use a dimple arrangement that requires no adjustment or addition of false parting lines. Therefore, if it is desirable to eliminate the equatorial parting line, it is best that it be done by including dimples that intersect the equator. Some U.S. patents that seek to place dimples upon the equator of the ball include U.S. Pat. Nos. 6,200,232, 6,123,534 and 5,688,193 to Kasashima et al., 5,840,351 to Inoue et al., and 4,653,758 to Solheim. These patents introduced "stepped" and/or "zig zag" parting lines. While this could potentially improve compliance with the symmetry, they did not sufficiently improve dimple coverage, since the parting lines include straight segments that do not permit tight dimple packing on opposite sides of the equator. A stepped path often results in a greater loss of dimple coverage than a straight path because it discourages interdigitation for a larger number of dimples. U.S. Pat. No. 6,936,208 to Ogg teaches the formulation of a partial or continuous tab created by overlapping of adjacent concave and convex tabs to reduce the dimension of the seam about the ball.

Therefore, a need exists for an improved golf ball, made from a mold that would have a parting line configuration that would minimize dimple damage during flash removal, improve symmetry performance, increase surface coverage, minimize the visual impact of the equator, and create a reduced amount of flash and the effort of removing it.

SUMMARY

The present invention relates to a golf ball produced by a mold that forms a castable cover on the golf ball (Example: urethane). The mold contains upper and lower hemispherical mold cups mated along a non-planar parting line. Both cups have interior cavity details, and when assembled create a generally spherical cavity to provide a dimple pattern on the golf ball. The upper and lower mold cups have non-planar mating surfaces, wherein each surface comprises a plurality of peaks and valleys which are created by a computerized modeling system that superimposes shorter wavelength secondary waveforms upon a longer wavelength base waveform. When assembled the parting line not only follows the dimple outline pattern but also allows the dimple outline pattern of one mold cup to interdigitate with the dimple outline pattern of the mating mold cup, thereby forming a golf ball without an obvious parting line (often erroneously referred to as a "seamless" ball). The non-planar surfaces of the molds comprise additional features to assist in the molding and finishing operations. These features are referred to as sprues which allow material to vent freely from the mating mold cups. As a result, internal cavity pressure is controlled minimizing mold flash on the ball equator. Further, these sprues, by design, leave small protrusions on the golf ball called "tabs" which are used to assist in the finishing process. Additionally, false sprues are used to create additional "tabs" to aid in alignment and orientation during finishing without affecting the flow of cover material during molding.

An objective of the present invention is for the tabs, which are subsequently removed and discarded, to occupy less than 15 percent of the non-planar surface. Further, their location is substantially offset from the equator.

The present invention provides a method for molding the non-planar mold parting surface comprising the steps of first, creating a 3-dimensional computer model representing the golf ball and then constructing a parting line profile represented as a 2-dimensional curve upon a positioned plane. Secondly, the parting line profile is projected onto a 3-dimensional surface of the golf ball model, which generates a radiated surface that contains the parting line which forms the parting surface of a model of the golf ball mold. Finally, the non-planar parting surface is manufactured on a golf ball mold by use of a CNC machine tool.

The present invention creates the non-planar parting line profile by use of a computerized modeling system such as either a CAD (Computer Aided Design) or CAE (Computer Aided Engineering). The non-planar parting line is composed of a longer wavelength base waveform, which conforms to the overall dimple pattern of the ball and a shorter wavelength secondary waveform or multiple waveforms, superimposed upon the base waveform to create a corrugated wave that conforms to the individual dimple perimeters at or near the ball equator. The final parting line is periodic, smooth, and continuous, and has an axis substantially coincident with the ball equator. Further, the amplitude of the final waveform is less than about 0.02 inches and more preferably less than 0.15 inches. Additionally, a restriction on the segmented length of the parting line is such that it does not exceed about 110 percent of the circumference of the equator, and more preferably does not exceed 106 percent.

DETAILED DESCRIPTION OF THE INVENTION

Figure 1:
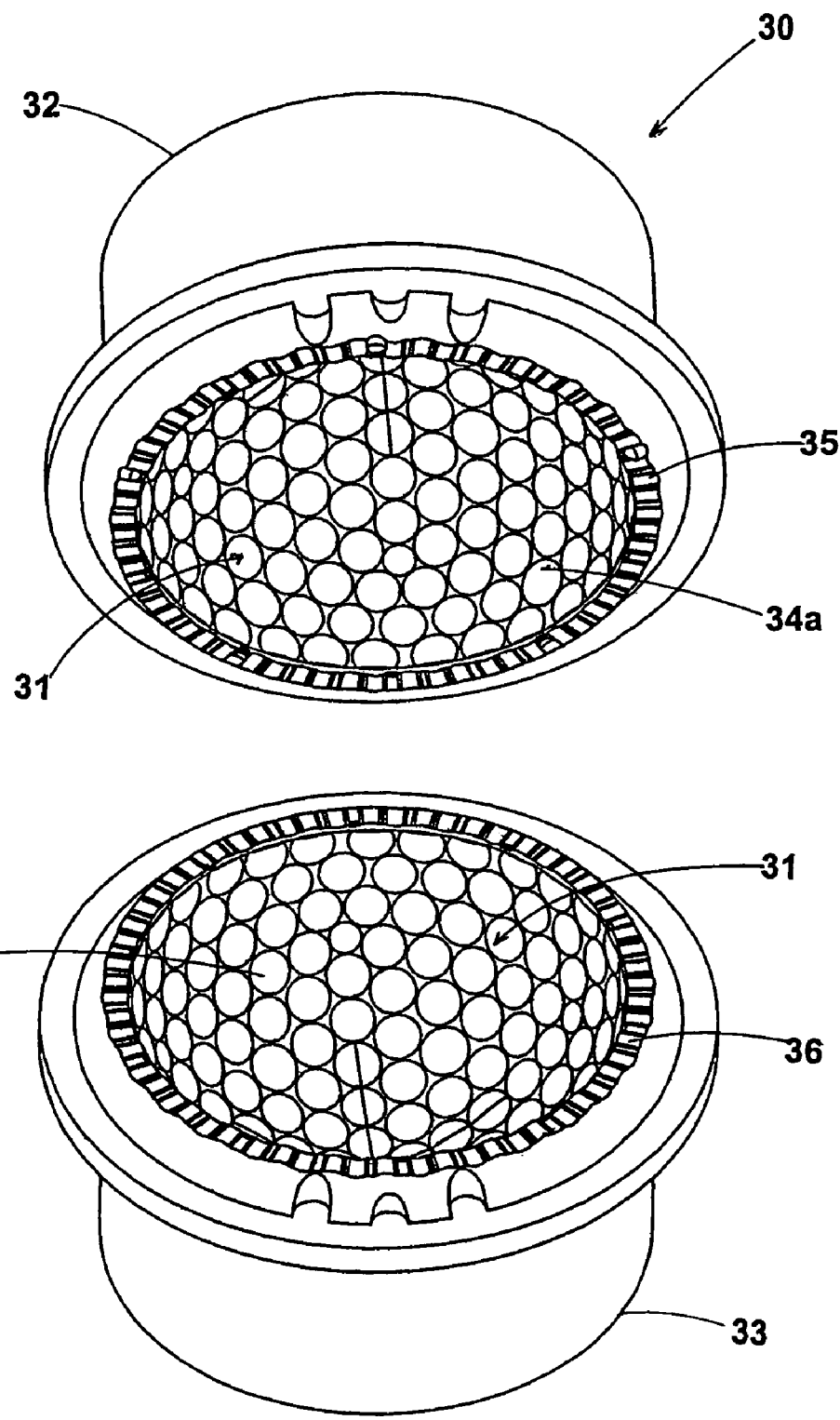
FIG. 1 is an enlarged pictorial expanded view of the mold comprising both mold halves.
Figure 2A:
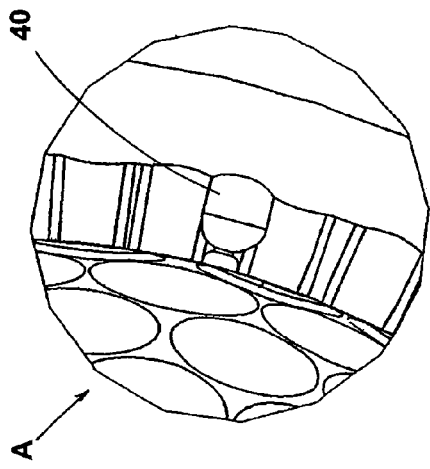
FIG. 2A is an enlarged view of detail A on FIG. 2 depicting a sprue detail.
Figure 2B:
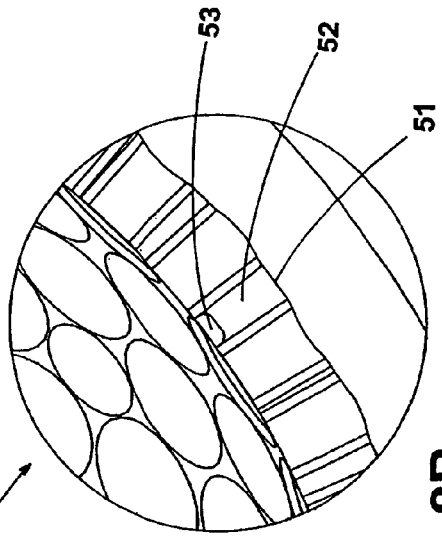
FIG. 2B is an enlarged view of detail B on FIG. 2 depicting a false sprue that allows for the creation of a "tab".
Figure 2:
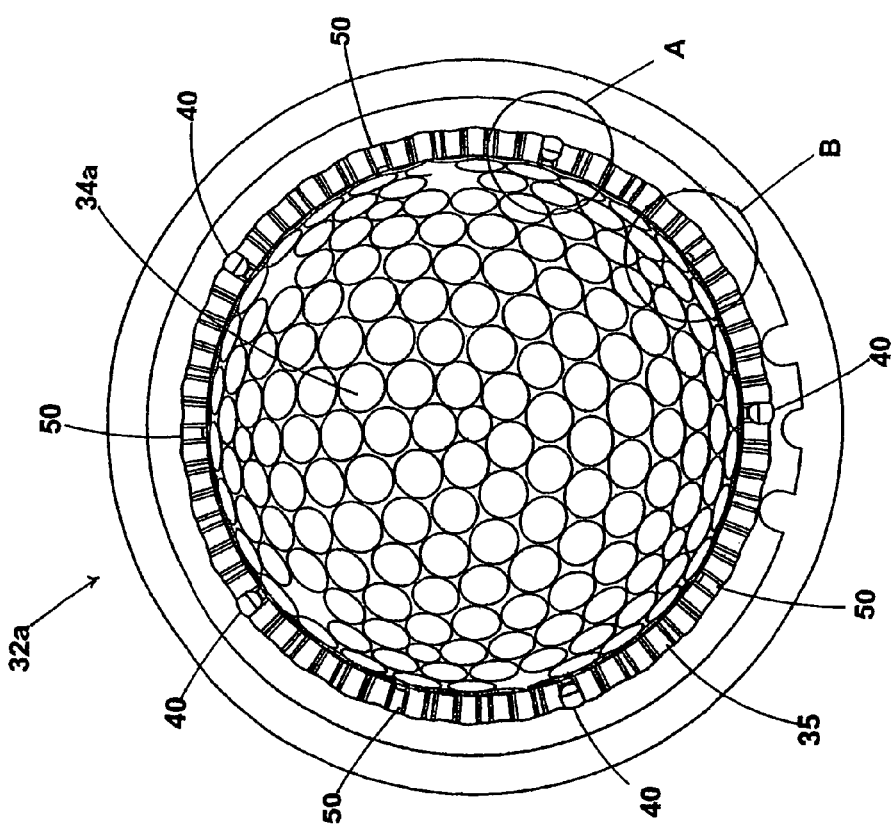
FIG. 2 is plan view of the upper mold half depicting sprues, and false sprues on the non-planar surface.

Referring to FIGS. 1 to 2b, wherein an improved mold of the present invention is shown, with the mold being indicated by the reference numeral 30, the mold 30 having a spherical cavity 31 which is used to form a cover for a golf ball wherein the mold 30 comprises generally hemispherical mold halves, an upper mold half 32 and a lower mold half 33, both halves having interior dimple cavity details 34a and 34b respectively with the details of the upper mold half 34a shown in FIGS. 2, 2A and 2B, for a mold designed to form a castable cover over a core, and when these halves are mated they define a dimple arrangement therein. Any dimple arrangement, such as icosahedral, octahedral, cube-octahedral, dipyramid, and the like could have the dimple pattern, although the preferred dimple pattern for the preferred embodiment of the invention is the icosahedron pattern. Although the preferred dimple is circular when viewed normal to the spherical cavity surface, the dimples may be oval, triangular, square, pentagonal, hexagonal, heptagonal, octagonal, etc. Possible cross-sectional shapes include, but are not limited to, circular arc, truncated cone, flattened trapezoid, and profiles defined by a parabolic curve, ellipse, semi-spherical curve, saucer-shaped curve, sine or catenary curve. Other possible dimple designs include dimples within dimples, constant depth dimples, or multilobe dimples, as disclosed in U.S. Pat. No. 6,749,525, incorporated herein in its entirety. In addition, more than one shape or type of dimple may be used on a single ball, if desired.

The preferred embodiment of the invention has upper and lower mold halves 32 and 33, each having non-planar parting surfaces 35 and 36 respectively, and are staggered such as each surface 35 and 36 comprises a plurality of peaks and valleys that constitute the staggered parting line's amplitude, and which are created by a method of defining, modeling, and manufacturing, using a computerized modeling system as discussed below. When assembled, the corrugated or non-planar parting line 37, shown in FIG. 5, follows the dimple outline pattern and allows the dimples of one mold half to interdigitate with the dimples of the mating mold half.

Figure 4:
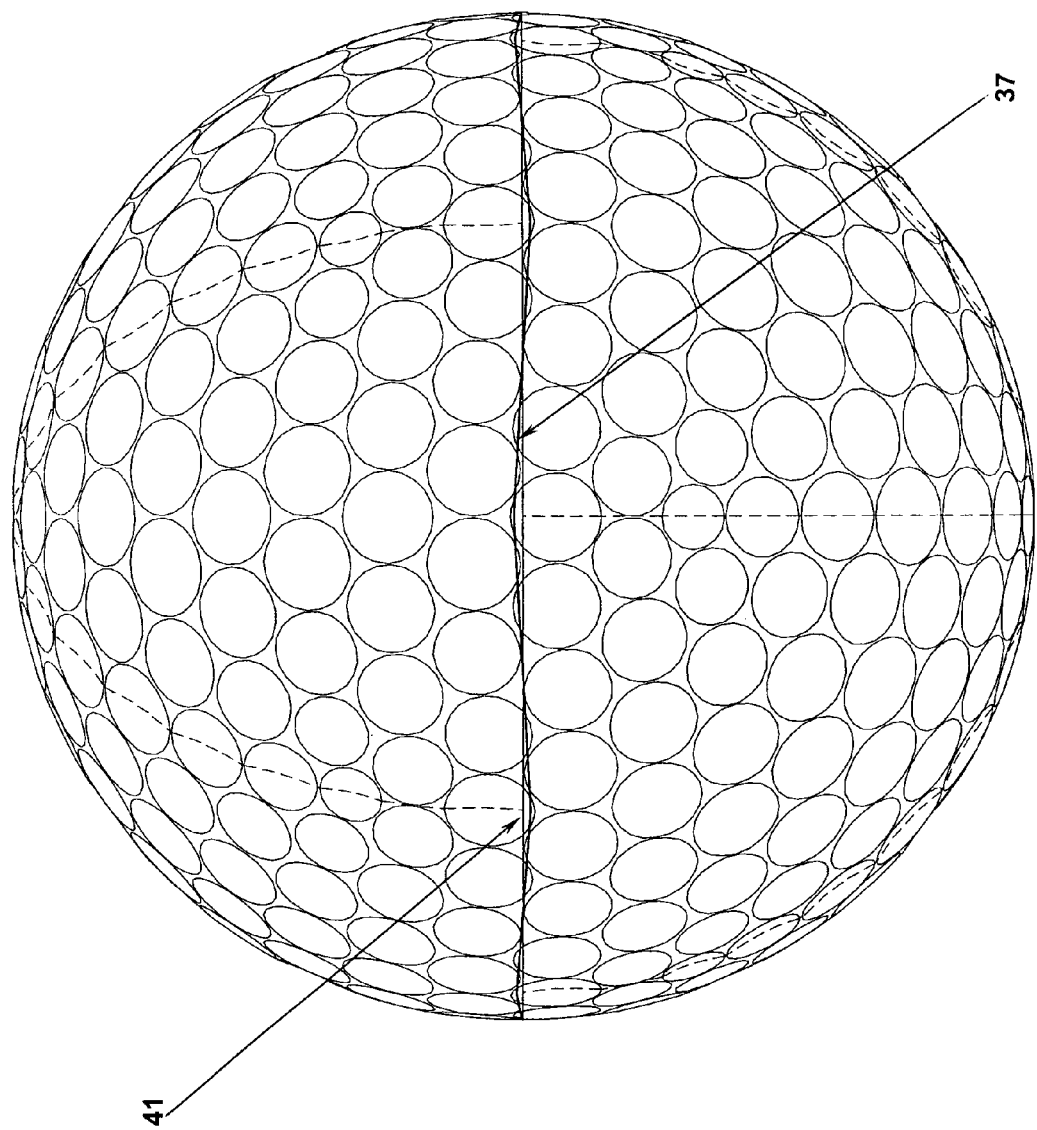
FIG. 4 is an enlarged view of a golf ball of depicting only a base waveform.
Figure 5:
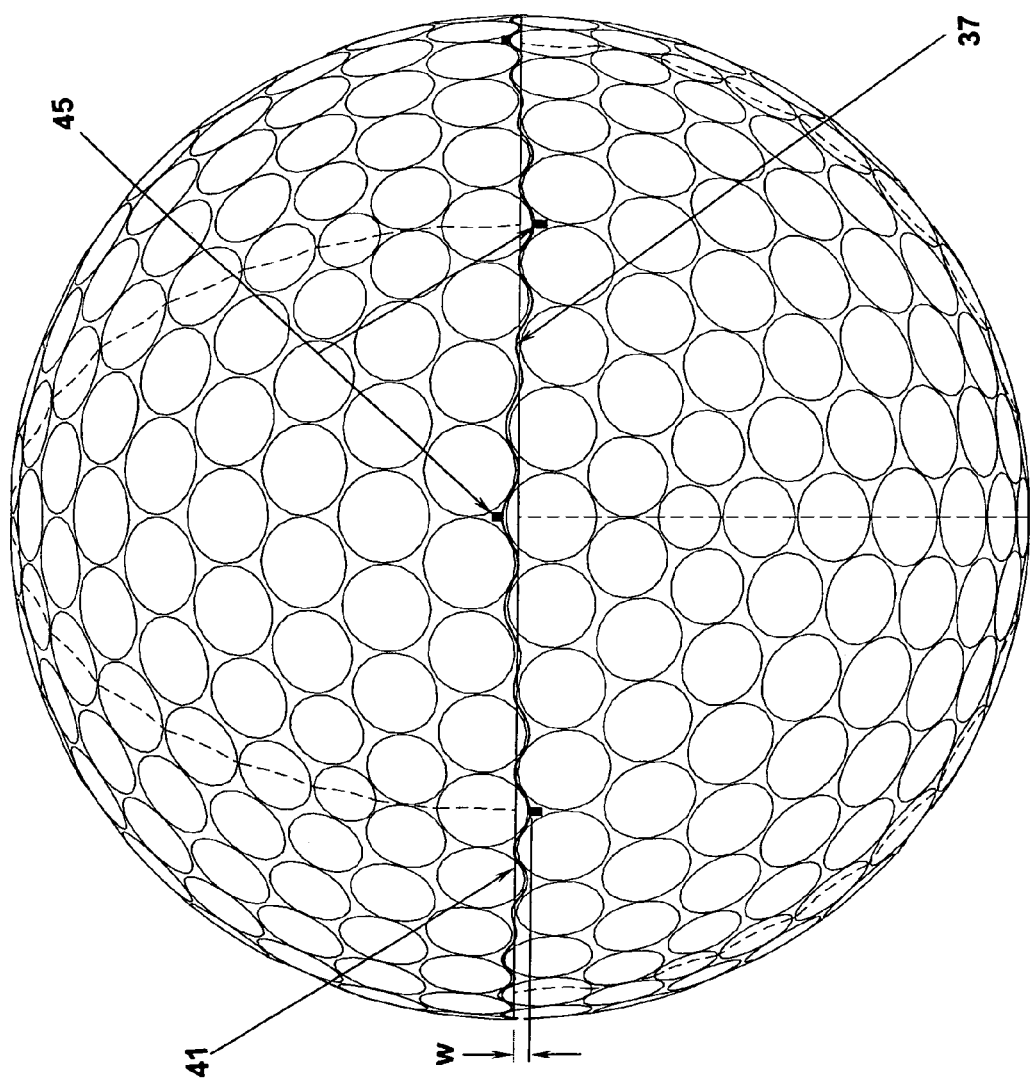
FIG. 5 is an enlarged view depicting the final parting line after the base waveform of FIG. 4 has been superimposed with shorter waveforms.
Figure 6:
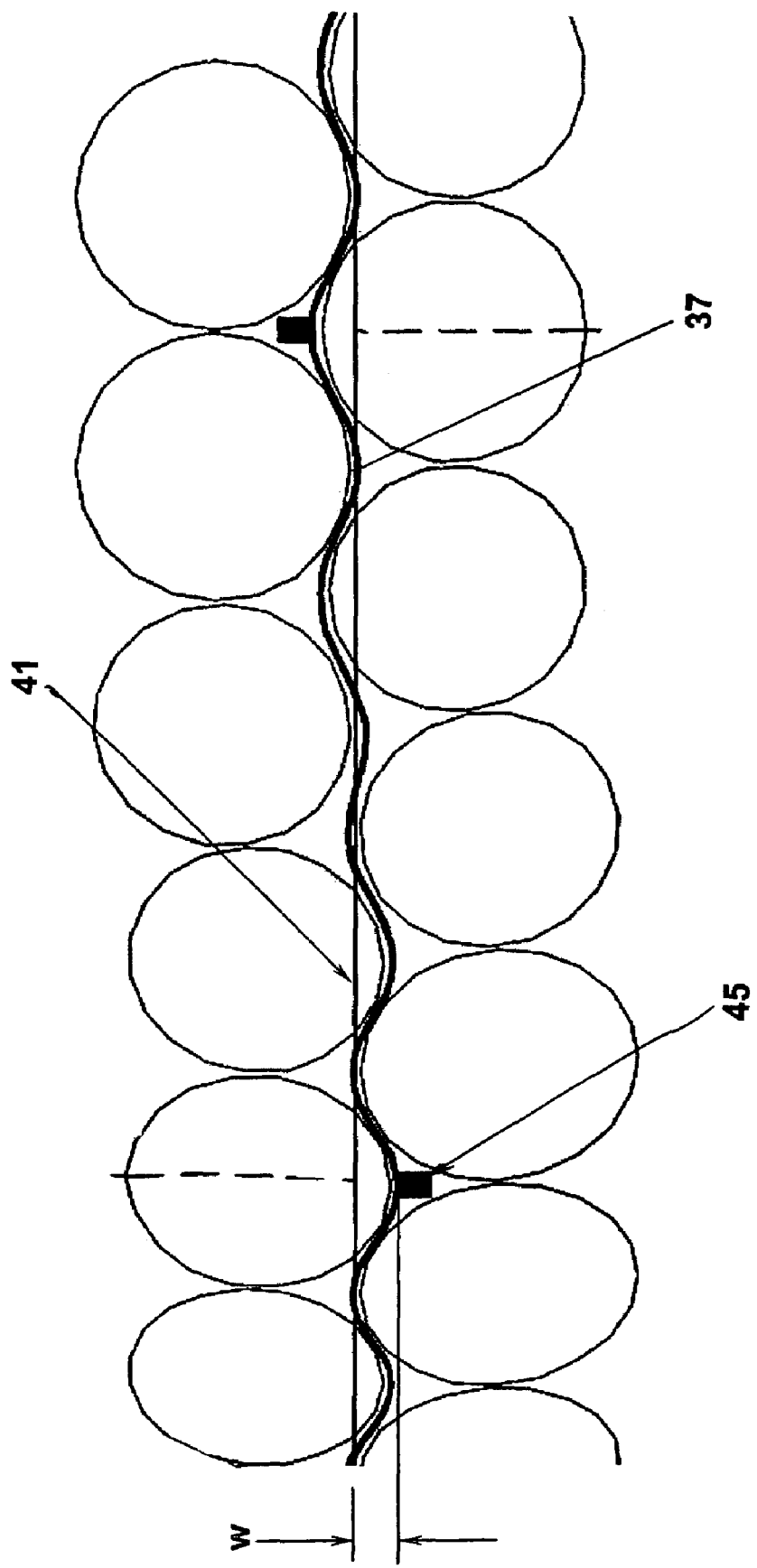
FIG. 6 is an enlarged section of the parting line configuration from FIG. 5.

The parting line configuration 37 is evident as a flash on the ball when it is removed from the mold. The corrugated or non-planar parting line 37 is machined to follow the profile of the equator dimples, thereby not crossing any of the equator dimple perimeters. Typically, the non-planar parting line 37, as it is machined, is offset from the dimples, to further assure no interference with the dimple perimeters. This produces the wavy or corrugated formed parting line consisting of multiple peaks and valleys. Typically, the wave amplitudes of the peaks (the highest points of the parting line) and valleys (the lowest points) are located above and below the theoretical center of the cavity halves and form a symmetric, continuous wave about an axis which is substantially coincident with the equator. FIGS. 5 and 6, show the completed parting line 37 configuration after the base waveform 38, shown in FIG. 4, has been superimposed by secondary (shorter wavelength) waveforms. Further, it should be noted that there is a functional relationship between these secondary waveforms and the underlying dimple pattern layout. The high degree of dimple interdigitation created by this method minimizes land area spacing along the parting line 37 and gives a more uniform distribution of surface coverage for improved aerodynamic symmetry. This is achieved by a modest wave amplitude w shown in FIG. 5. Wave amplitude here is understood to describe the maximum deviation of the final parting line waveform from its horizontal axis. Preferably, the final wave amplitude is 0.020 inches or less. More preferably, it is 0.015 inches or less. This requirement further restricts the length of the parting line 37 to be no more than 110 percent of the circumference of the equator, and more preferably no more than 106 percent of the circumference of the equator.

Figure 3:
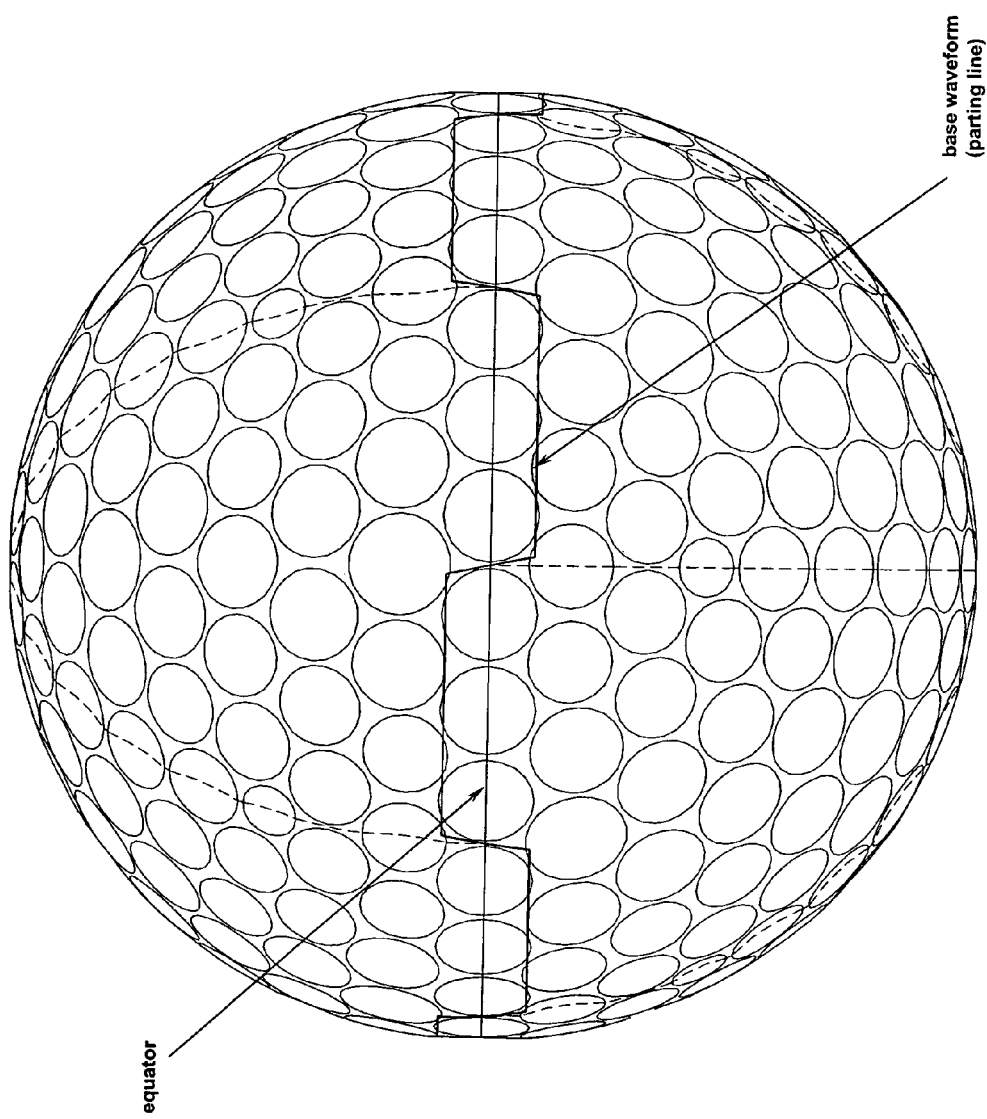
FIG. 3 is a prior art view of a golf ball having a corrugated parting line.

Most "seamless" molding methods today define groups of dimples that traverse back and forth across the theoretical mid-plane of a non-planar parting line, as seen in FIG. 3. The above described method of the present invention defines a method whereby the position of each dimple can be easily and individually defined (not as a group of dimples) thereby identifying the undulating surface of the cavity, regardless of the dimple pattern.

A primary inventive concept of the present invention is shown on FIGS. 2, 2A, and 2B, which illustrates the upper mold 32a having a mold surface 35 for mating with the lower mold 33 for creating castable covered balls. The non-planar parting line cavity design of the present invention incorporates the use of uniformly spaced sprues, and false sprues whose location are dependent on the dimple pattern. As depicted in FIGS. 2, 2A, 2B, true sprues (vents) 40 and false sprues 50 are incorporated in the mold design. The design of the sprues 40 and 50 are such that a small section of material (a "tab") is intentionally molded onto the ball and stays attached to the ball until the finishing process wherein they are removed by cutting or knifing. These tabs 45 assure that the molded ball can be finished utilizing conventional finishing methods with only slight changes, at most, to the finishing machinery. The actual dimensions, locations and number of tabs 45 are dependent upon the dimple pattern of the ball. The dimple pattern shown in FIGS. 1-6 is that of an icosahedron-based dimple pattern. The tab 45 is a result of the land area 51 on surface 35, shown in FIG. 2b, having a partially undercut section 53 allowing for a relatively small recess 53 to fill with cover material therein creating the tab 45. In addition to the false sprues 50, this cavity design incorporates the use of true sprues (vents) 40 which are depicted in detail in FIG. 2A. The true sprues (vents) 40 function primarily to provide a vent for trapped air and/or excess material to pack around the core and flow out of the cavity as needed. By design, the true sprues also maintain relief at the inside of the mold cavity thereby producing a tab 45. The total number of tabs 45 is dependent upon the specific dimple pattern among other factors.

The combination of two factors, first, a non-planar parting line, and secondly, the tabs 45 that are molded in from the sprues and false sprues, allow for a seamless ball to be oriented and properly aligned as it enters the finishing operation, namely a buffing machine. When golf balls are spun on the orienting stations of the buffing machine, the molded-in tabs provide location of the actual buffing line. If alignment is not complete in a pre-determined amount of time, the ball will not be buffed and will be rejected as an un-buffed ball, which will require another pass through the machine at a later time. One of the key concepts of the present invention is for the creation of the tabs that will properly orient the ball for removal of flash. Another inherent advantage of the tabs as created by the present invention is that their removal can be done by a cutting knife which is a time saver over buffing or grinding off the flash.

The molded golf ball 40 (which may include a core, core layers, and/or intermediate layers, and at least one cover layer), having the non-planar parting line configuration is described on FIGS. 5 and 6, with the location of the traditional equator indicated by 41. The parting line 37 can be described as the superposition of a base waveform 38 with at least one secondary waveform.

The base waveform has a wavelength of $\lambda 1 = \pi D/n$, where D is the diameter of the spherical mold cavity and n is an integer that depends on the dimple pattern, usually between 3 and 6. In other words $\lambda 1$ is generally ⅓, ¼, ⅕, or ⅙ the circumference of the mold cavity. The secondary waveforms $\lambda 2$ have shorter wavelengths that are generally between ¼ and ¹⁄₁₂ of $\lambda 1$.

The base waveform $\lambda 1$ makes an integral number of cycles around the equator or seam area of the molded golf ball 40. The specific number of cycles is dependent upon the geometric characteristics of the dimple pattern. For example, octahedron-based patterns typically employ a sub-pattern of dimples that is repeated four times around the equator of the ball. In cooperation with this, the base waveform will have four repetitions of its cycle in one trip around the equator, giving it a wavelength of ¼ of the circumference of the ball. Icosahedron-based patterns, shown in the present invention, usually have a five fold repetition around the equator, thus for the present invention they will usually employ a base waveform having a wavelength ⅕ the circumference of the ball. For the present invention, the base waveform 38 is periodic, and has an axis substantially coincident with the ball equator 41. Further, the present invention reveals dimples on opposing sides of the base waveform 38 being contained predominantly in only one hemisphere. Clearly, a parting line defined only by the base waveform 38 shown in FIG. 4 would intersect at least some of the dimples. This would result in mold line defects which would be difficult to eliminate in the finishing operation. The superimposing of shorter secondary wavelengths upon the base waveform 38 allows the final parting line 37 configuration to maintain space from the dimple edges and avoid intersecting dimples on opposing sides of the parting line 37.

As previously stated, the non-planar parting line of the above mold 30 is a result of incorporating into a mold a cavity design having a staggered rim definition (non-planar parting surface) which is created by using a computerized modeling system such as CAD (Computer Aided Design), CAE (Computer Aided Engineering), or similar type of system, along with a CNC machine tool. Preferably, the modeling system incorporates parametric 3-dimensional solid modeling capabilities that are helpful to properly manufacture and process castable covered golf balls.

Most dimple patterns incorporate repeating segments that are used to define the overall dimple arrangement. In such cases, it is only necessary to model a portion or portions of the golf ball or mold that are sufficient to define the entire golf ball or mold.

In the manufacture of a golf ball, it is important that the parting surfaces of the molds mate very precisely. This minimizes the amount of flash and other parting line artifacts, which benefits the cosmetic quality of the finished golf ball, and it also produces greater uniformity and control over the size, weight, and roundness of the ball. Most golf ball molds employ a planar parting surface to easily provide a very precise mate. However, as previously discussed, the resulting great circle parting line on the molded ball introduces restrictions on dimple placement, which can affect the aerodynamic performance. This may manifest itself as reduced distance, reduced accuracy, or variations in performance depending on the orientation of the ball. Also, to some golfers the appearance of a great circle parting line free of dimples is less appealing.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all modifications and embodiments, which would come within the spirit and scope of the present invention. The dimple patterns of the present invention can be used with any type of golf ball with any playing characteristics. For example, the dimple pattern can be used with conventional golf balls, solid or wound. These balls typically have at least one core layer and at least one cover layer. Wound balls typically have a spherical solid rubber or liquid filled center with a tensioned elastomeric thread wound thereon. Wound balls typically travel a shorter distance, however, when struck as compared to a two piece ball. The cores of solid balls are generally formed of a polybutadiene composition. In addition to one-piece cores, solid cores can also contain a number of layers, such as in a dual core golf ball. Covers, for solid or wound balls, are generally formed of ionomer resins, balata, or polyurethane, and can consist of a single layer or include a plurality of layers and, optionally, at least one intermediate layer disposed about the core.

All of the patents and patent applications mentioned herein by number are incorporated by reference in their entireties.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents.

We claim as our invention:

1. A golf ball having a non-planar parting line on its spherical surface, the golf ball comprising:
   a base waveform correlating to a dimple pattern of the ball;
   the non-planar parting line resulting from superimposing the base waveform with at least one shorter wavelength secondary waveform wherein the non-planar parting line is functionally dependent on the individual dimple geometry; and
   the non-planar parting line comprising of a plurality of wave amplitudes that are offset from the dimples so as not to intersect any dimple edge while allowing the dimples on opposing hemispheres of the golf ball to interdigitate;
   the non-planar parting line has a length less than 110 percent of the ball equator circumference; and
   wherein the base waveform has a wavelength defined by the relationship $\lambda=\pi D/n$, is periodic and has an axis substantially coincident with the ball equator.

2. The golf ball according to claim 1, wherein the dimple pattern of the ball is an icosahedron-based dimple pattern.

3. The golf ball according to claim 1, wherein the dimple pattern of the ball is octahedral-based dimple pattern.

4. The golf ball according to claim 1, wherein the dimple pattern of the ball is a cube-octahedral dimple pattern.

5. The golf ball according to claim 1, wherein the dimple pattern of the ball is a hexagonal dipyramid dimple pattern.

6. The golf ball according to claim 1, wherein a plurality of tabs are formed at positions substantially coincident with the highest and/or lowest points of the non-planar parting line.

7. The golf ball according to claim 6, wherein the number of tabs is at least twenty.

8. The golf ball according to claim 1, wherein the base waveform has a wavelength of about ⅕ of the circumference of the ball.

* * * * *